US012586154B2

(12) United States Patent
Zhao et al.

(10) Patent No.: US 12,586,154 B2
(45) Date of Patent: Mar. 24, 2026

(54) FEATURE MAP PROCESSING METHOD AND RELATED DEVICE

(71) Applicant: HUAWEI TECHNOLOGIES CO., LTD., Shenzhen (CN)

(72) Inventors: Yin Zhao, Hangzhou (CN); Jue Mao, Hangzhou (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 290 days.

(21) Appl. No.: 18/400,522

(22) Filed: Dec. 29, 2023

(65) Prior Publication Data

US 2024/0135491 A1 Apr. 25, 2024
US 2024/0233075 A9 Jul. 11, 2024

Related U.S. Application Data

(63) Continuation of application No. PCT/CN2022/101753, filed on Jun. 28, 2022.

(30) Foreign Application Priority Data

Jun. 30, 2021 (CN) .......................... 202110740186.4

(51) Int. Cl.
*G06T 7/60* (2017.01)
*G06T 3/4046* (2024.01)

(52) U.S. Cl.
CPC .............. *G06T 3/4046* (2013.01); *G06T 7/60* (2013.01); *G06T 2207/20081* (2013.01); *G06T 2207/20084* (2013.01)

(58) Field of Classification Search
CPC ..................... G06T 3/4046; G06T 7/60; G06T 2207/20081; G06T 2207/20084;
(Continued)

(56) References Cited

U.S. PATENT DOCUMENTS

2020/0234147 A1* 7/2020 Kim ....................... G06N 3/105
2020/0294249 A1 9/2020 Li et al.

FOREIGN PATENT DOCUMENTS

CN 109447247 A 3/2019
CN 108921042 B 8/2019
(Continued)

OTHER PUBLICATIONS

Robert Torfason et al:"Towards Image Understanding From Deep Compression Without Decoding." arXiv:1803.06131v1 [cs.CV] Mar. 16, 2018. total 17 pages.
(Continued)

*Primary Examiner* — Stephen P Coleman
(74) *Attorney, Agent, or Firm* — WOMBLE BOND DICKINSON (US) LLP

(57) ABSTRACT

This application relates to the field of artificial intelligence technologies, and provides a feature map processing method and a related device. The method is implemented by invoking a neural network model that includes a plurality of input adaptation branches and a post-processing part. An output of each of the plurality of input adaptation branches is an input of the post-processing part, and each of the plurality of input adaptation branches can downsample a feature map at a different ratio.

20 Claims, 4 Drawing Sheets

(58) Field of Classification Search
CPC ..... G06F 16/906; G06F 18/213; G06N 3/045;
G06N 3/084; G06N 3/04; G06N 3/08;
G06V 10/764
USPC ........................................................ 382/156
See application file for complete search history.

(56) References Cited

FOREIGN PATENT DOCUMENTS

| | | |
|----|----|----|
| CN | 112668584 A | 4/2021 |
| EP | 3451293 A1 | 3/2019 |

OTHER PUBLICATIONS

Johannes Balle et al:"Variational Image Compression With a Scale Hyperprior." arXiv:1802.01436v2 [eess.IV] May 1, 2018. total 23 pages.

Tsung-Yi Lin et al:"Feature Pyramid Networks for Object Detection." arXiv:1612.03144v2 [cs. CV] Apr. 19, 2017. total 10 pages.

Javad Abbasi Aghamaleki et al:"Multi-stream CNN for facial expression recognition in limited training data." Apr. 25, 2019. total 22 pages.

* cited by examiner

301

Input a first feature map to one of a plurality of input adaptation branches, to obtain a second feature map, where the one input adaptation branch is determined based on a size of the first feature map and a preset size threshold, the preset size threshold is an upper limit size of an input feature map of a post-processing part, and a size of the second feature map is not greater than the preset size threshold

302

Input the second feature map to the post-processing part for post-processing, to obtain a processing result of the first feature map

FIG. 3

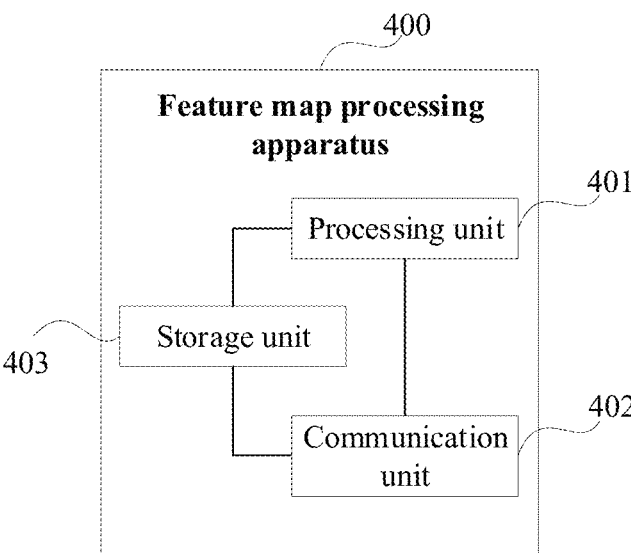

FEATURE MAP PROCESSING METHOD AND RELATED DEVICE

CROSS-REFERENCE TO RELATED APPLICATIONS

This application is a continuation of International Application No. PCT/CN2022/101753, filed on Jun. 28, 2022, which claims priority to Chinese Patent Application No. 202110740186.4, filed on Jun. 30, 2021. The disclosures of the aforementioned applications are hereby incorporated by reference in their entireties.

TECHNICAL FIELD

Embodiments of this application relate to the field of artificial intelligence (AI) technologies, and in particular, to a feature map processing method and a related device.

BACKGROUND

An existing neural network for a machine task is a visual task neural network that uses an image as an input (which is briefly referred to as an image domain task network). That is, the input of the image domain task network is an image, and the image domain task network processes the input image and then outputs a processing result. When the image domain task network is used in combination with video or image encoding/decoding, a decoding end (for example, an artificial neural network-based image decoder) needs to first parse a bitstream to generate a reconstructed feature map, and then input the reconstructed feature map to an image reconstruction network to generate a reconstructed image. The reconstructed image is used as the input of the image domain task network. Therefore, high computing power is required when the image domain task network is used in combination with video or image encoding/decoding.

SUMMARY

This application provides a feature map processing method and a related device, to reduce computing power.

The foregoing and other objectives are achieved by the subject matter of the independent claims. Other implementations are clear from the dependent claims, the description of embodiments, and the accompanying drawings.

Specific embodiments are outlined in the attached independent claims, and other embodiments are outlined in the dependent claims.

According to a first aspect, this application relates to a feature map processing method. The method is performed by an electronic device, and the method is implemented by invoking a neural network model. The neural network model includes a plurality of input adaptation branches and a post-processing part. An output of each of the plurality of input adaptation branches is an input of the post-processing part. The plurality of input adaptation branches are configured to downsample a feature map, and each of the plurality of input adaptation branches has a different downsampling ratio for the feature map. The method includes: inputting a first feature map to one of the plurality of input adaptation branches, to obtain a second feature map, where the one input adaptation branch is determined based on a size of the first feature map and a preset size threshold, the preset size threshold is an upper limit size of an input feature map of the post-processing part, and a size of the second feature map is not greater than the preset size threshold; and inputting the second feature map to the post-processing part for post-processing, to obtain a processing result of the first feature map.

In an embodiment of this application, a visual task neural network used for processing a machine task is a feature domain task network that uses a feature map as an input. For example, for the neural network model designed in this application, an input may be a feature map reconstructed by parsing a bitstream by a decoder, and an output is a task processing result corresponding to the feature map. In this way, compared with an image domain task network, a process of obtaining a reconstructed image based on the reconstructed feature map is skipped, to reduce computing power. In addition, computing power required for the neural network model to process the feature map is lower than that required to process an image. Further, the neural network model designed in this application includes the plurality of input adaptation branches and the post-processing part. The output of each of the plurality of input adaptation branches is the input of the post-processing part, and each of the plurality of input adaptation branches may downsample the feature map at a different ratio. For each of first feature maps with different sizes (resolutions) input to the neural network model, one input adaptation branch may be selected from the plurality of input adaptation branches based on a size of the first feature map and the upper limit size of the input feature map of the post-processing part, and the first feature map is downsampled by using the one input adaptation branch, to generate a second feature map whose size is not greater than the upper limit size of the input feature map of the post-processing part. In this way, the second feature map meets a size requirement of the post-processing part for the input feature map, and the second feature map is input to the post-processing part for post-processing, to obtain a processing result of the first feature map. Therefore, in this application, when the input feature map of the neural network model has a different resolution, a high analysis precision may be maintained by using similar computing power. In addition, compared with a case in which an independent neural network model (each network has similar computing power) is trained for an input feature map with each resolution, and then a feature map with a different resolution is processed by using a neural network model trained for the different resolution, the neural network model designed in this application can implement a same function by using the plurality of input adaptation branches, the plurality of input adaptation branches are a backbone network front part in the neural network model, and the neural network model has only one post-processing part (e.g., a backbone network core part and a head network). In this way, network parameters can be significantly reduced, and the network model does not need to be switched during inference, to reduce difficulty in model deployment.

In an embodiment, any first input adaptation branch that is in the plurality of input adaptation branches and whose downsampling ratio for the feature map is an integer multiple includes at least one first convolutional layer, the at least one first convolutional layer is configured to downsample the feature map, and a stride of the at least one first convolutional layer is determined based on the downsampling ratio of the any first input adaptation branch for the feature map.

In this embodiment, the any first input adaptation branch whose downsampling ratio for the feature map is an integer multiple may downsample the input feature map by using the at least one first convolutional layer. A ratio at which the feature map is downsampled by using the convolutional layer is related to a stride of the convolutional layer. After the stride of the at least one first convolutional layer is determined based on the downsampling ratio of the any first input adaptation branch for the feature map, the feature map input to the any first input adaptation branch may be downsampled at a ratio of an integer multiple. For example, the downsampling ratio of the any first input adaptation branch for the feature map is 2, and the stride of the at least one first convolutional layer is 2. In this case, the at least one first convolutional layer may reduce a size of the feature map input to the any first input adaptation branch by two times.

In an embodiment, any second input adaptation branch that is in the plurality of input adaptation branches and whose downsampling ratio for the feature map is a non-integer multiple includes at least one upsampling module and at least one second convolutional layer, the at least one upsampling module is configured to upsample the feature map, the at least one second convolutional layer is configured to downsample a feature map obtained through upsampling, and an upsampling ratio of the at least one upsampling module for the feature map and a stride of the at least one second convolutional layer are determined based on the downsampling ratio of the any second input adaptation branch for the feature map.

In this embodiment, the any second input adaptation branch whose downsampling ratio for the feature map is a non-integer multiple may first upsample the input feature map by using the at least one upsampling module, and then downsample, by using the at least one second convolutional layer, the feature map obtained through upsampling. A ratio at which the feature map is downsampled by using the convolutional layer is related to a stride of the convolutional layer. After the upsampling ratio of the at least one upsampling module for the feature map and the stride of the at least one second convolutional layer are determined based on the downsampling ratio of the any second input adaptation branch for the feature map, the feature map input to the any second input adaptation branch may be downsampled at a ratio of a non-integer multiple. For example, the downsampling ratio of the any second input adaptation branch for the feature map is 1.5, the upsampling ratio of the at least one upsampling module for the feature map is 2, and the stride of the at least one second convolutional layer is 3. In this case, the any second input adaptation branch may first increase a size of the input feature map by two times, and then reduce the size of the input feature map by three times for output, so that the size of the feature map is overall reduced by 1.5 times from input to output.

In an embodiment, any third input adaptation branch that is in the plurality of input adaptation branches and whose downsampling ratio for the feature map is greater than 1 includes at least one residual block (ResBlock) structure, the at least one residual block structure is configured to downsample the feature map, the at least one residual block structure includes a plurality of third convolutional layers, and a stride of any one of the plurality of third convolutional layers is determined based on the downsampling ratio of the any third input adaptation branch for the feature map.

In this embodiment, the any third input adaptation branch whose downsampling ratio for the feature map is greater than 1 may downsample the input feature map by using the at least one residual block structure. The at least one residual block structure includes the plurality of third convolutional layers, and a ratio at which the feature map is downsampled by using the convolutional layer is related to a stride of the convolutional layer. Therefore, after the stride of the any one of the plurality of third convolutional layers is determined based on the downsampling ratio of the any third input adaptation branch for the feature map, the feature map input to the any third input adaptation branch may be downsampled at a ratio greater than 1. In addition, it may be understood that the residual block structure further includes another layer in addition to the plurality of third convolutional layers used for downsampling, but the another layer does not change a size of the input feature map, and the convolutional layer changes the size of the input feature map.

In an embodiment, the one input adaptation branch is determined based on a maximum value between a first ratio and a second ratio, the first ratio is a ratio of a width of the first feature map to a width of the preset size threshold, and the second ratio is a ratio of a height of the first feature map to a height of the preset size threshold.

In this embodiment, the ratio of the width of the first feature map to the width of the upper limit size of the input feature map of the post-processing part and the ratio of the height of the first feature map to the height of the upper limit size of the input feature map of the post-processing part are calculated, and then one input adaptation branch is selected from the plurality of input adaptation branches based on the maximum value between the two ratios, to downsample the first feature map. In this way, it can be ensured that a width and a height of a feature map obtained by downsampling the first feature map are not respectively greater than the width and the height of the upper limit size of the input feature map of the post-processing part.

In an embodiment, if the size of the second feature map is greater than the preset size threshold, the method further includes: capturing a third feature map from the second feature map, where a size of the third feature map is not greater than the preset size threshold; and inputting the third feature map to the post-processing part for post-processing, to obtain a processing result of the first feature map.

In this embodiment, the input first feature map may have an excessively large size, and after downsampling is performed by using an input adaptation branch, for example, after downsampling is performed by using an input adaptation branch with a highest downsampling ratio, a size of an obtained second feature map may still be greater than the upper limit size of the input feature map of the post-processing part. In this case, a third feature map whose size is not greater than the upper limit size of the input feature map of the post-processing part is captured from the second feature map, and the third feature map is input to the post-processing part for post-processing, to obtain a processing result of the first feature map. In this way, it can be ensured that the processing result of the first feature map can be obtained after the first feature map input to the neural network model is processed.

In an embodiment, the first feature map is a feature map obtained by decoding a bitstream.

In this embodiment, the first feature map input to the neural network model is a feature map obtained by decoding a bitstream. For example, the first feature map is a feature map obtained by decoding a feature map bitstream by using an entropy decoding module of an end-to-end image decoder. Therefore, for video or image encoding/decoding, a process in which image reconstruction is performed on the feature map obtained by decoding a bitstream, to obtain a reconstructed image and input the reconstructed image to the neural network model for processing does not need to be performed. That is, an image reconstruction process may be omitted, and the feature map obtained by decoding a bitstream is directly input to the neural network model for analysis, to reduce computing power.

In an embodiment, the method further includes: performing N rounds of training on the neural network model based on a training sample set, to obtain N first loss values, where the training sample set includes sample feature maps with at least N sizes, N is not less than a quantity of the plurality of input adaptation branches, and N is an integer; obtaining a second loss value based on the N first loss values; and updating a parameter of the neural network model based on the second loss value.

In this embodiment, the training sample set used to train the neural network model designed in this application includes sample feature maps with at least N sizes, and a value of N is not less than the quantity of the plurality of input adaptation branches. In this way, when the neural network model is trained by using the training sample set, each of the plurality of input adaptation branches can be trained. Therefore, the N first loss values obtained by performing the N rounds of training on the neural network model include a first loss value corresponding to any one of the plurality of input adaptation branches. The second loss value is obtained based on the N first loss values, and then the parameter of the neural network model is updated based on the second loss value. In this way, a parameter of the any one of the plurality of input adaptation branches is also updated.

According to a second aspect, this application relates to a feature map processing apparatus. For beneficial effects, refer to descriptions of the first aspect. Details are not described herein. The feature map processing apparatus has a function of implementing behavior in the method instance in the first aspect. The function may be implemented by hardware, or may be implemented by hardware by executing corresponding software. The hardware or the software includes one or more modules corresponding to the function. In an embodiment, the feature map processing apparatus is implemented by invoking a neural network model. The neural network model includes a plurality of input adaptation branches and a post-processing part. An output of each of the plurality of input adaptation branches is coupled to an input of the post-processing part. The plurality of input adaptation branches are configured to downsample a feature map, and each of the plurality of input adaptation branches has a different downsampling ratio for the feature map. The apparatus includes a processing unit, configured to: input a first feature map to one of the plurality of input adaptation branches, to obtain a second feature map, where the one input adaptation branch is determined based on a size of the first feature map and a preset size threshold, the preset size threshold is an upper limit size of an input feature map of the post-processing part, and a size of the second feature map is not greater than the preset size threshold; and input the second feature map to the post-processing part for post-processing, to obtain a processing result of the first feature map.

In an embodiment, any first input adaptation branch that is in the plurality of input adaptation branches and whose downsampling ratio for the feature map is an integer multiple includes at least one first convolutional layer, the at least one first convolutional layer is configured to downsample the feature map, and a stride of the at least one first convolutional layer is determined based on the downsampling ratio of the any first input adaptation branch for the feature map.

In an embodiment, any second input adaptation branch that is in the plurality of input adaptation branches and whose downsampling ratio for the feature map is a non-integer multiple includes at least one upsampling module and at least one second convolutional layer, the at least one upsampling module is configured to upsample the feature map, the at least one second convolutional layer is configured to downsample a feature map obtained through upsampling, and an upsampling ratio of the at least one upsampling module for the feature map and a stride of the at least one second convolutional layer are determined based on the downsampling ratio of the any second input adaptation branch for the feature map.

In an embodiment, any third input adaptation branch that is in the plurality of input adaptation branches and whose downsampling ratio for the feature map is greater than 1 includes at least one residual block (ResBlock) structure, the at least one residual block structure is configured to downsample the feature map, the at least one residual block structure includes a plurality of third convolutional layers, and a stride of any one of the plurality of third convolutional layers is determined based on the downsampling ratio of the any third input adaptation branch for the feature map.

In an embodiment, the one input adaptation branch is determined based on a maximum value between a first ratio and a second ratio, the first ratio is a ratio of a width of the first feature map to a width of the preset size threshold, and the second ratio is a ratio of a height of the first feature map to a height of the preset size threshold.

In an embodiment, if the size of the second feature map is greater than the preset size threshold, the processing unit is further configured to: capture a third feature map from the second feature map, where a size of the third feature map is not greater than the preset size threshold; and input the third feature map to the post-processing part for post-processing, to obtain a processing result of the first feature map.

In an embodiment, the first feature map is a feature map obtained by decoding a bitstream.

In an embodiment, the processing unit is further configured to: perform N rounds of training on the neural network model based on a training sample set, to obtain N first loss values, where the training sample set includes sample feature maps with at least N sizes, N is not less than a quantity of the plurality of input adaptation branches, and N is an integer; obtain a second loss value based on the N first loss values; and update a parameter of the neural network model based on the second loss value.

According to a third aspect, this application relates to an electronic device, including one or more processors and a non-transitory computer-readable storage medium that is coupled to the processor and that stores a program to be executed by the processor. When the program is executed by the processor, the electronic device is enabled to perform the method according to any one of the possible embodiments of the first aspect.

According to a fourth aspect, this application relates to a non-transitory computer-readable storage medium, including program code. When the program code is executed by a computer device, the method according to any one of the possible embodiments of the first aspect is performed.

According to a fifth aspect, this application relates to a computer program product including program code. When the program code is run, the method according to any one of the possible embodiments of the first aspect is performed.

According to a sixth aspect, this application relates to a chip, including a processor, configured to: invoke a computer program from a memory and run the computer program, to enable a device in which the chip is installed to perform the method according to any one of the first aspect.

One or more embodiments are described in detail in the accompanying drawings and the following descriptions. Other features, objectives, and advantages are clear from the description, the accompanying drawings, and the claims.

BRIEF DESCRIPTION OF DRAWINGS

The following describes accompanying drawings used in embodiments of this application.

FIG. 3 is a schematic flowchart of a feature map processing method according to an embodiment of this application;

FIG. 4 is a schematic diagram of a structure of a feature map processing apparatus according to an embodiment of this application.

DESCRIPTION OF EMBODIMENTS

Figure 1:
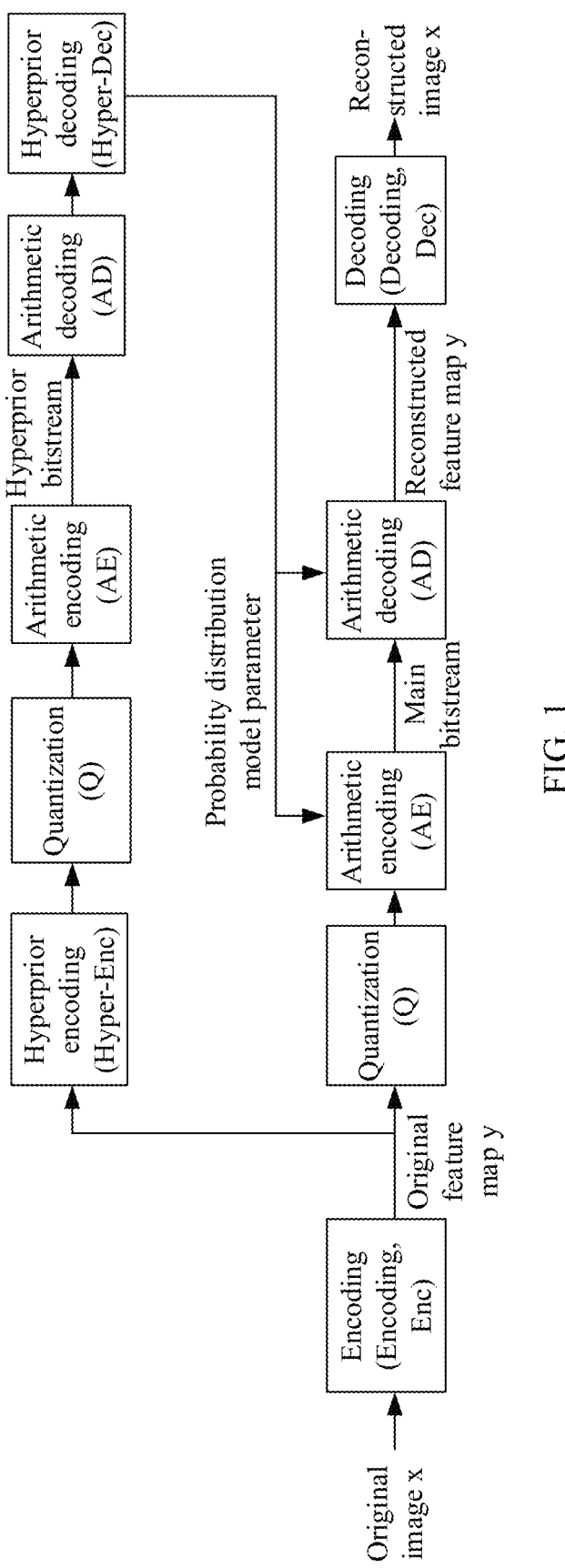
FIG. 1 is a schematic diagram of an artificial neural network-based image codec.

Some technical knowledge in embodiments of this application is first described, to facilitate understanding of this application by persons skilled in the art.

(1) Convolutional Neural Network (CNN)

A convolutional neural network is a typical method in the field of image processing and analysis. A convolutional neural network includes at least a convolutional layer, and may further include an activation layer, a pooling layer, a batch normalization layer (BN layer for short), a fully connected layer (FC layer for short), and another functional module. The activation layer may be a rectified linear unit (ReLU), a parametric rectified linear unit (PReLU), or the like. Typical convolutional neural networks include, for example, LeNet, AlexNet, VGGNet, ResNet, YOLO, a faster R-CNN, a mask R-CNN, and ASLFeat. A basic convolutional neural network may include a backbone network and a head network, for example, AlexNet in object recognition. Some complex CNNs, for example, a faster R-CNN network with a feature pyramid structure in the target detection field, include a backbone network, a neck network, and a head network.

The backbone network is a first part of the convolutional neural network, and a function of the backbone network is to extract feature maps of a plurality of scales from an input image. The backbone network usually includes a convolutional layer, a pooling layer, an activation layer, and the like, and does not include a fully connected layer. Usually, in the backbone network, a layer closer to the input image outputs a feature map with a higher resolution (width and height) and a smaller quantity of channels. Typical backbone networks include VGG-16, ResNet-50, ResNeXt-101, and the like. The backbone network may be divided into two parts: a backbone network front part and a backbone network core part. The backbone network front part is several layers, in the backbone network, close to an input, and is also referred to as a stem. The backbone network front part usually includes a small quantity of convolutional layers, and may further include a layer in another form, for example, a pooling layer. The backbone network front part preliminarily processes an input signal to reduce a spatial resolution and increase a quantity of channels. For example, in ResNet-50, an input side is a structure including a convolutional layer with a 7×7 convolution kernel and a maximum pooling layer (Max Pool). A part other than the backbone network front part is the backbone network core part. The backbone network core part usually includes a large quantity of convolutional layers and some network sub-modules that are connected in series and that have a same or similar structure, for example, a residual block (ResBlock) structure in ResNet.

The neck network is a middle part of the convolutional neural network, and a function of the neck network is to further integrate and process the feature map generated by the backbone network, to obtain a new feature map. A common neck network includes, for example, a feature pyramid network (FPN).

The head network is a last part of the convolutional neural network, and a function of the head network is to process the feature map to obtain a predicted result output by the neural network. A common head network includes a fully connected layer, a normalized exponential function (Softmax) module, and the like.

A bottleneck structure is a multi-layer network structure. Input data of the network first passes through one or more neural network layers to obtain intermediate data, and then the intermediate data passes through one or more neural network layers to obtain output data. A data volume (namely, a product of a width, a height, and a quantity of channels) of the intermediate data is less than a volume of the input data and a volume of the output data.

A feature map is three-dimensional data output by the convolutional layer, the activation layer, the pooling layer, the batch normalization layer, and the like in the convolutional neural network. Three dimensions of the feature map are respectively referred to as a width, a height, and a channel.

The neural network needs to be trained to determine a parameter of each layer in the neural network. In a training process, a trainable parameter of the neural network is updated by using forward loss calculation and gradient backpropagation. The parameter is updated for a plurality of times, so that the parameter of each layer in the neural network ultimately converges to a better analysis precision. After training is completed, the parameter of each layer in the network is usually fixed, and an input signal passes through the neural network to obtain a result. This actual process of using the neural network is referred to as "inference".

(2) Artificial Neural Network-Based Image Codec

Since 2017, the artificial neural network-based image codec has developed rapidly from an early autoencoder-based structure and a recurrent neural network (RNN)-based structure to a higher-performance variational autoencoder (VAE) structure. Compression performance of the variational autoencoder structure may be equivalent to that of H.266/VCC (versatile video coding) coding. A classic network model is shown in FIG. 1.

At an encoding end, an original image x is input to a feature extraction module, that is, input to an encoding (Enc) module, to output an original feature map y. Feature extraction is performed on the original feature map y by using a hyperprior encoding (Hyper-Enc) module, to output prior information $\hat{z}$. The prior information $\hat{z}$ is quantized to obtain quantized information $\hat{z}$. The quantized information $\hat{z}$ is input to a probability estimation module, to output a probability distribution model parameter of each feature element $\hat{z}[x][y][i]$, so as to obtain probability distribution of each feature element $\hat{z}[x][y][i]$. An entropy encoding or arithmetic encoding (AE) module performs arithmetic encoding on each feature element based on the probability distribution, to obtain a hyperprior bitstream. An entropy decoding or arithmetic decoding (AD) module performs entropy decoding on the hyperprior bitstream, to obtain a value of the feature element $\hat{z}[x][y][i]$. A hyperprior decoding (Hyper-Dec) module performs image reconstruction, to output a reconstructed map (namely, a reconstructed feature map y) of the feature map y. In addition, the original feature map y is input to a quantization module, to obtain a quantized feature map $\hat{y}$. The entropy encoding module obtains probability distribution of each feature element $\hat{y}[x][y][i]$ based on the probability distribution model parameter obtained by the hyperprior decoding module, and performs entropy encoding on each feature element $\hat{y}[x][y][i]$ in the quantized feature map $\hat{y}$ based on the probability distribution, to obtain an encoded bitstream.

At a decoding end, the decoding end parses the bitstream, and outputs probability distribution of a to-be-encoded symbol $\hat{y}$ based on the probability distribution model parameter transmitted by the hyperprior decoding module. The entropy decoding module performs arithmetic decoding on each feature element $\hat{y}[x][y][i]$ in the quantized feature map $\hat{y}$ based on the probability distribution of each feature element $\hat{y}[x][y][i]$, to obtain the value of the feature element $\hat{y}[x][y][i]$; and inputs the feature map $\hat{y}$ to an image reconstruction module to output a reconstructed map.

In addition, probability estimation modules in some variational autoencoders (VAE) further use a decoded feature element around a current feature element, to more accurately estimate probability distribution of the current feature element.

(3) Feature Domain Task Network

An existing neural network for a machine task is a visual task neural network (which is briefly referred to as an image domain task network) that uses an image as an input. That is, the input of the image domain task network is an image, and the image domain task network processes the input image and then outputs a processing result. Image domain task networks include, for example, ResNet, a faster R-CNN, a mask R-CNN, and YOLO. When the image domain task network is used in combination with video or image encoding/decoding, a decoder (for example, an artificial neural network-based image decoder) needs to first parse a bitstream to generate a reconstructed feature map, and then input the reconstructed feature map to an image reconstruction network to generate a reconstructed image. The reconstructed image is used as the input of the image domain task network.

This application provides a feature map domain visual task neural network (which is briefly referred to as a feature domain task network) that uses a feature map (a feature map obtained by an artificial neural network-based codec) as an input. An advantage of the feature domain task network is that an image decoding network is skipped, a reconstructed feature map generated by parsing a bitstream is used as an input, and a visual task is directly executed, to significantly reduce computing power.

Compared with the image domain task network, the feature domain task network has an obvious disadvantage. When the image domain task network runs on a device with low computing power, a to-be-analyzed image A (for example, an image reconstructed through decoding) may be downsampled into an image B with a lower resolution, and then the image B is input to the image domain task network, to reduce computing power required during neural network inference. This is because the computing power required during neural network inference increases with a resolution of an input image. Common downsampling processing includes bilinear interpolation, nearest interpolation, and bicubic interpolation downsampling, for example, a torch.nn.functional.interpolate function in PyTorch. After the image is downsampled, an analysis precision of the image domain task network is not significantly reduced. That is, an analysis precision obtained by inputting the image A with a high resolution to the image domain task network is slightly higher than an analysis precision obtained by inputting the image B with a low resolution to the image domain task network, and there is a small difference between the two analysis precisions. For example, for performance of a ResNet-50 network on an ImageNet validation set, a reduction amplitude is approximately 1%. This feature enables the image domain task network to easily adjust the computing power by downsampling the input image.

However, for the feature domain task network, if a feature map input to the network is scaled by using a conventional downsampling method such as bilinear interpolation, an analysis precision is significantly reduced. This is because the feature map is more nonlinear than an image, and information in the feature map is destroyed if the feature map is downsampled by using a method such as bilinear interpolation or nearest interpolation. For example, for performance of a cResNet-39 network on an ImageNet validation set, if 2× downsampling is performed on an input feature map by using the nearest interpolation method, an analysis precision is reduced by more than 10%.

The technical solutions provided in this application are described below in detail with reference to specific implementations.

Figure 2:
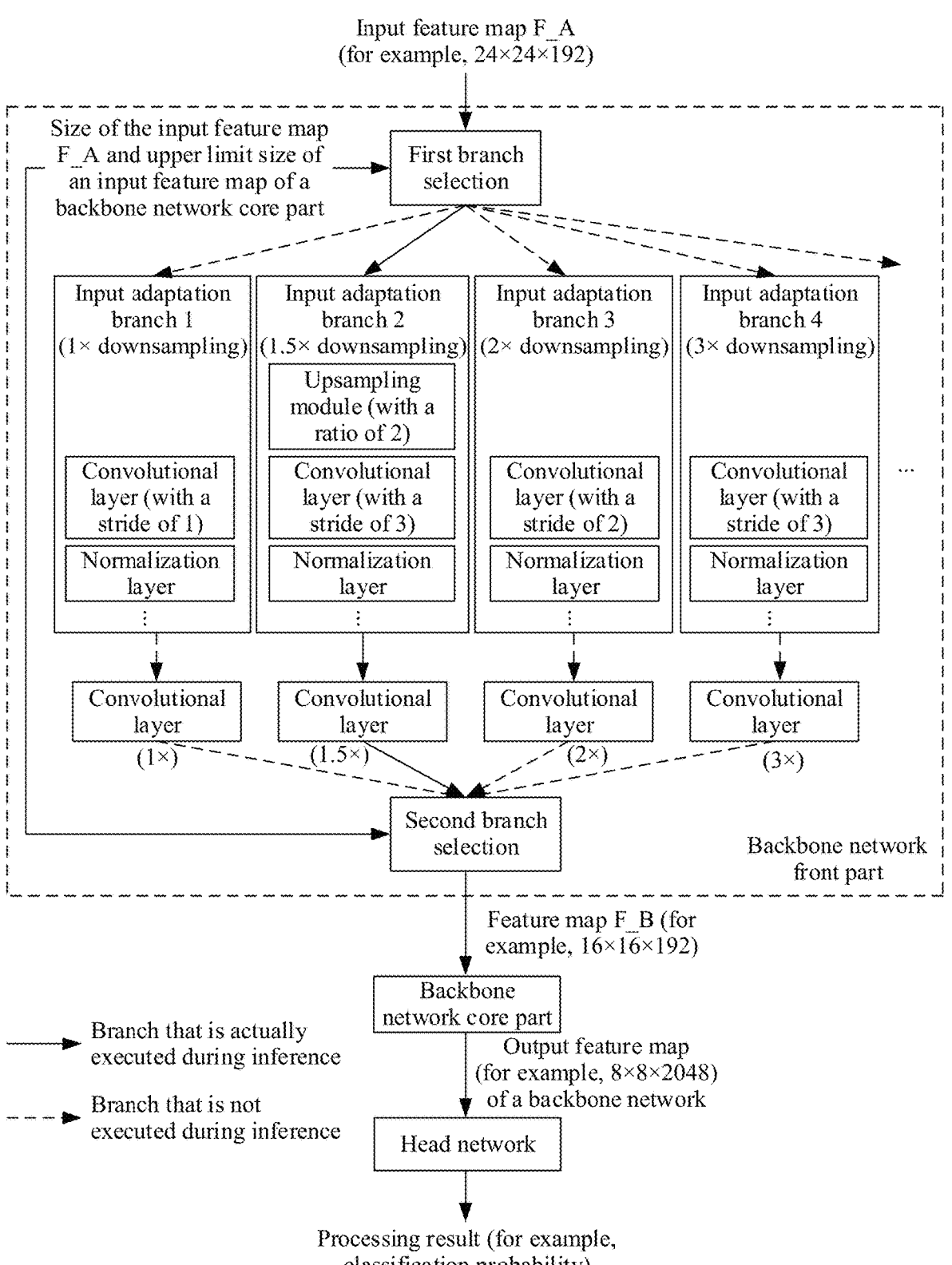
FIG. 2 is a schematic diagram of an architecture of a neural network model according to an embodiment of this application.

FIG. 2 is a schematic diagram of an architecture of a neural network model according to an embodiment of this application. As shown in FIG. 2, the architecture of the neural network model is a feature domain task network structure, for example, may be a structure of a feature domain task network oriented to a feature map obtained by an artificial neural network-based codec. Alternatively, the architecture of the neural network model is a multi-input adaptation branch network (Multi-stem Network) oriented to a feature map input. The neural network model includes a backbone network and a head network. The backbone network includes a backbone network front part and a backbone network core part (including most layers in the backbone network). The backbone network front part includes a plurality of input adaptation branches (Multiple Stems, also referred to as multi-stem branches) and a branch selection module. The plurality of input adaptation branches have different feature map size adjustment capabilities. The branch selection module includes a first branch selection module. The first branch selection module may select one input adaptation branch from the plurality of input adaptation branches based on a size of an input feature map of the neural network model and an upper limit size of an input feature map of the backbone network core part. After the one input adaptation branch is selected, the input feature map of the neural network model is input to the one input adaptation branch for downsampling. After downsampling is performed, a feature map whose size is not greater than the upper limit size of the input feature map of the backbone network core part is obtained, and the feature map obtained after downsampling is an input of the backbone network core part.

The backbone network core part is a common technology in the machine vision field, for example, may be a VGG network structure including a plurality of convolutional layers, a ResNet structure including a plurality of Res-Blocks, or an Inception structure.

The head network may be a classification head network including a fully connected layer, a detection box head network for predicting a position of an object detection box, or the like.

A processing result output by the neural network model may be a classification probability vector in an image classification task, and the classification probability vector describes a probability value of each classification. Alternatively, a processing result output by the neural network model may be an image segmentation image, a facial recognition result, an object detection box, or the like. This is not specifically limited in this application.

It should be noted that a neck network (not shown in FIG. 2) may be further disposed between the backbone network and the head network in the neural network model. The neck network performs fusion processing on feature maps of a plurality of scales generated by the backbone network, and then sends a processing result to the head network. Typical neck networks are a faster R-CNN with a feature pyramid structure (FPN) and a YOLOv4 network.

As described above, the neural network model selects an input adaptation branch based on a size of an input feature map F_A and the upper limit size of the input feature map of the backbone network core part, to process F_A. A size of an output feature map F_B falls within a preset size threshold range. For example, the size of the feature map F_B is not greater than the upper limit size of the input feature map of the backbone network core part. Then, the feature map F_B continues to be input to the backbone network core part. Then, processing is performed by the backbone network core part, the neck network (not shown in FIG. 2), and/or the head network, and the head network outputs a processing result. The size of the feature map F_B falls within the preset size threshold range. Therefore, computing power of the backbone network core part, the neck network, and/or the head network may be limited to a specific range. In this way, this application may be applied to a feature domain task network that uses feature maps with a plurality of resolutions as inputs, so that computing power of the feature domain task network remains at a similar level for the feature maps with a plurality of resolutions, and analysis of the input feature maps with a plurality of resolutions can be supported on a same device with limited computing power by using a model.

As described above, the input adaptation branches in the neural network model downsample the feature map at different ratios. An example is provided below for description.

In an example, as shown in FIG. 2, the neural network model includes four input adaptation branches: an input adaptation branch 1 (completes 1× downsampling), an input adaptation branch 2 (completes 1.5× downsampling), an input adaptation branch 3 (completes 2× downsampling), and an input adaptation branch 4 (completes 3× downsampling). Details are as follows:

Input adaptation branch 1: A width and a height of a feature map F_A_1 output by the input adaptation branch 1 are respectively the same as a width and a height of the input feature map F_A, that is, the input adaptation branch 1 completes 1× downsampling. The input adaptation branch 1 includes at least one convolutional layer, and a stride (stride) of each of the at least one convolutional layer is 1. Optionally, the input adaptation branch 1 may further include a batch normalization layer and an activation layer (for example, a ReLU layer). These layers are commonly used layers in a convolutional neural network. A padding parameter of the convolutional layer is usually set to $(K-1)//2$, where "//2" represents rounding after dividing by 2, and K is a size of a convolution kernel (kernel size).

Input adaptation branch 2: A width and a height of a feature map F_A_2 output by the input adaptation branch 2 are respectively ⅔ of the width and the height of the input feature map F_A, that is, the input adaptation branch 2 completes 1.5× downsampling. In the input adaptation branch 2, 2× upsampling is first performed on the feature map F_A through upsampling (for example, nearest neighbor upsampling), to obtain a feature map F_A', and then the feature map F_A' passes through a convolutional layer with a stride of 3 to complete 3× downsampling, to achieve overall 1.5× downsampling effect. Optionally, the input adaptation branch 2 may further include another convolutional layer with a stride of 1, a BN layer, a ReLU layer, and the like. This is not specifically limited in this application.

Input adaptation branch 3: A width and a height of a feature map F_A_3 output by the input adaptation branch 3 are respectively ½ of the width and the height of the input feature map F_A, that is, the input adaptation branch 3 completes 2× downsampling. In the input adaptation branch 3, the feature map F_A passes through a convolutional layer with a stride of 2, to complete 2× downsampling. Optionally, the input adaptation branch 3 may further include another convolutional layer with a stride of 1, a BN layer, a ReLU layer, and the like. This is not specifically limited in this application.

Input adaptation branch 4: A width and a height of a feature map F_A_4 output by the input adaptation branch 4 are respectively ⅓ of the width and the height of the input feature map F_A, that is, the input adaptation branch 4 completes 3× downsampling. In the input adaptation branch 4, the feature map F_A passes through a convolutional layer with a stride of 3, to complete 3× downsampling. Optionally, the input adaptation branch 4 may further include another convolutional layer with a stride of 1, a BN layer, a ReLU layer, and the like. This is not specifically limited in this application.

In an example, in addition to the foregoing manner of completing downsampling by connecting one or more convolutional layers in series, an input adaptation branch whose downsampling ratio is greater than 1 may use a more complex structure such as a residual block (ResBlock) structure. For example, for the input adaptation branch 3 that implements 2× downsampling, the input feature map F_A passes through a convolutional layer with a 1×1 convolution kernel and a stride of 2, to obtain an intermediate result F_a; the input feature map F_A also passes through a convolutional layer with a 3×3 convolution kernel and a stride of 2 and a ReLU layer, to generate an intermediate result F_b, and then F_b passes through a convolutional layer, to generate F_c; and F_c and F_a are added to obtain F_d. An output of the input adaptation branch 3 is F_d or a result obtained after F_d passes through a ReLU layer.

In an implementation, the first branch selection module selects a specific input adaptation branch based on the upper limit size (Th_W, Th_H) of the input feature map of the backbone network core part and the size (In_W, In_H) of the input feature map of the neural network model, so that a size of a feature map output after the input feature map passes through the selected input adaptation branch does not exceed (Th_W, Th_H). Herein, Th_W is a width of the upper limit size of the input feature map of the backbone network core part, Th_H is a height of the upper limit size of the input feature map of the backbone network core part, In_W is a width of the input feature map of the neural network model, and In_H is a height of the input feature map of the neural network model. The input adaptation branch 1, the input adaptation branch 2, the input adaptation branch 3, and the input adaptation branch 4 are used as an example. An example input adaptation branch selection manner is as follows:

It is denoted that RW=In_W/Th_W, and RH=In_H/Th_H.

If max(RW, RH)≤1, the input adaptation branch 1 is used.

Otherwise, if max(RW, RH)≤1.5, the input adaptation branch 2 is used.

Otherwise, if max(RW, RH)≤2, the input adaptation branch 3 is used.

Otherwise, the input adaptation branch 4 is used.

Herein, the function max(a, b) represents that a maximum value between a and b is selected.

For example, as shown in FIG. 2, when Th_W and Th_H are set to 16, for an input feature map F_A whose width and height are 24, after determining by the branch selection module, the input feature map F_A is input to the input adaptation branch 2 to complete 1.5× downsampling, and a feature map F_B whose width and height are 16 is output. Similarly, for an input feature map F_A whose width and height are 32, the input adaptation branch 3 is selected to complete 2× downsampling, and a feature map F_B whose width and height are 16 is output. Similarly, for an input feature map F_A whose width and height are 48, the input adaptation branch 4 is selected to complete 3× downsampling, and a feature map F_B whose width and height are 16 is output; and for an input feature map F_A whose width and height are 42, the input adaptation branch 4 is also selected to complete 3× downsampling, and a feature map F_B whose width and height are 14 is output.

In an example, the backbone network front part may include only an input adaptation branch 1 and an input adaptation branch 3. In this case, for example, processing by the branch selection module is as follows: If max(RW, RH)≤1, the input adaptation branch 1 is used. Otherwise, the input adaptation branch 3 is used.

In an example, the backbone network front part may include an input adaptation branch 1, an input adaptation branch 2, and an input adaptation branch 4. Processing by the branch selection module is similar to that described above. Details are not described herein.

In an example, when the input feature map F_A has a large resolution range, the backbone network front part may further include another input adaptation branch with a higher downsampling ratio, for example, an input adaptation branch with a ratio of 4× downsampling. The input feature map F_A may be input to two convolutional layers with a stride of 2, to implement 4× downsampling. A method for implementing downsampling by using a plurality of convolutional layers with a stride greater than 1 may be any manner. This is not specifically limited herein, and details are not described herein.

In an embodiment, the branch selection module may further include a second branch selection module. The second branch selection module may be configured to: select an output feature map of an actually executed input adaptation branch, and input the output feature map to the backbone network core part. In a software-based implementation, the second branch selection module may not be required. In this implementation, a program invokes, based on a determining result of the first branch selection module, a corresponding branch to generate an output feature map, and stores the output feature map in a public variable P (that is, the output feature map is stored in the variable P regardless of a branch that is invoked), and the backbone network core part reads the public variable P. Therefore, the second branch selection module does not explicitly appear in a processing process. In a hardware-based implementation, each adaptation branch is usually circuited. In this case, the first branch selection module (completes selection of an input adaptation branch network to which an input feature map is to flow) and the second branch selection module (completes selection of an input adaptation branch network out of which an output feature map is to flow) are required.

In an embodiment, the backbone network front part further includes a plurality of convolutional layers. The plurality of convolutional layers are convolutional layers between any one of the plurality of input adaptation branches and the second branch selection module. An input of any one of the plurality of convolutional layers is an output of the any one of the plurality of input adaptation branches, and an output of the any one of the plurality of convolutional layers is an input of the second branch selection module. The any one of the plurality of convolutional layers may be used to improve a fitting capability of the input adaptation branch, so that feature maps output by the input adaptation branches can have similar distribution.

It should be noted that a specific implementation of a quantity of input adaptation branches in the neural network model and a specific implementation of downsampling performed by each input adaptation branch on the feature map are not specifically limited in this application. The foregoing is merely an example for description.

FIG. 3 is a flowchart of a process 300 of a feature map processing method according to an embodiment of this application. The process 300 is described as a series of steps or operations. It should be understood that the process 300 may be performed in various sequences and/or simultaneously, and is not limited to an execution sequence shown in FIG. 3. The process 300 may be performed by an electronic device. Specifically, the process 300 may be performed by the electronic device by invoking a neural network model. The neural network model includes a plurality of input adaptation branches and a post-processing part. An output of each of the plurality of input adaptation branches is an input of the post-processing part. The plurality of input adaptation branches are configured to downsample a feature map, and each of the plurality of input adaptation branches has a different downsampling ratio for the feature map. The neural network model may be the neural network model shown in FIG. 2, and the post-processing part is a part other than a backbone network front part in the neural network model shown in FIG. 2. For example, the post-processing part includes a backbone network core part and a head network in the neural network model shown in FIG. 2, and optionally further includes a neck network. The process 300 includes but is not limited to the following steps or operations.

In operation 301, an electronic device inputs a first feature map to one of the plurality of input adaptation branches, to obtain a second feature map, where the one input adaptation branch is determined based on a size of the first feature map and a preset size threshold, the preset size threshold is an upper limit size of an input feature map of the post-processing part, and a size of the second feature map is not greater than the preset size threshold.

A source of the feature map input to the neural network model is not specifically limited in this application, and may be any source.

In an embodiment, the first feature map is a feature map obtained by decoding a bitstream.

For example, the first feature map input to the neural network model may be a feature map obtained by decoding a bitstream, namely, a feature map obtained by decoding a feature map bitstream by using an entropy decoding module of an end-to-end image decoder (as shown in FIG. 1). The feature map obtained through decoding by the entropy decoding module usually has a large size (resolution), and a larger size of the feature map requires higher computing power. Therefore, when computing power of the neural network model is given, a feature map with an excessively large size needs to be downsampled before being processed.

For example, the first feature map may be the input feature map F_A in FIG. 2, the second feature map may be the feature map F_B in FIG. 2, and the preset size threshold is the upper limit size of the input feature map of the backbone network core part in FIG. 2. In this case, one of the plurality of input adaptation branches is selected, based on a size of the input feature map F_A and the upper limit size of the input feature map of the backbone network core part, to process F_A, to obtain the feature map F_B. Each input adaptation branch downsamples the feature map at a different ratio, and quantities of channels of feature maps output by all the input adaptation branches are the same.

In this embodiment, the first feature map input to the neural network model is a feature map obtained by decoding a bitstream. For example, the first feature map is a feature map obtained by decoding a feature map bitstream by using an entropy decoding module of an end-to-end image decoder. Therefore, for video or image encoding/decoding, a process in which image reconstruction is performed on the feature map obtained by decoding a bitstream, to obtain a reconstructed image and input the reconstructed image to the neural network model for processing does not need to be performed. That is, an image reconstruction process may be omitted, and the feature map obtained by decoding a bitstream is directly input to the neural network model for analysis, to reduce computing power.

In an embodiment, any first input adaptation branch that is in the plurality of input adaptation branches and whose downsampling ratio for the feature map is an integer multiple includes at least one first convolutional layer, the at least one first convolutional layer is configured to downsample the feature map, and a stride of the at least one first convolutional layer is determined based on the downsampling ratio of the any first input adaptation branch for the feature map.

For example, downsampling ratios of the input adaptation branch 1, the input adaptation branch 3, and the input adaptation branch 4 shown in FIG. 2 are an integer multiple. In this case, the first input adaptation branch may be any one of the input adaptation branch 1, the input adaptation branch 3, and the input adaptation branch 4, the first convolutional layer may be a convolutional layer in the any one of the input adaptation branch 1, the input adaptation branch 3, and the input adaptation branch 4, and a stride of the convolutional layer in the any one of the input adaptation branch 1, the input adaptation branch 3, and the input adaptation branch 4 is determined based on a corresponding downsampling ratio. For example, the downsampling ratio of the input adaptation branch 1 is 1, and a stride of a convolutional layer in the input adaptation branch 1 is 1; the downsampling ratio of the input adaptation branch 3 is 2, and a stride of a convolutional layer in the input adaptation branch 3 is 2; and the downsampling ratio of the input adaptation branch 4 is 3, and a stride of a convolutional layer in the input adaptation branch 4 is 3.

In an embodiment, the any first input adaptation branch whose downsampling ratio for the feature map is an integer multiple may downsample the input feature map by using the at least one first convolutional layer. A ratio at which the feature map is downsampled by using the convolutional layer is related to a stride of the convolutional layer. After the stride of the at least one first convolutional layer is determined based on the downsampling ratio of the any first input adaptation branch for the feature map, the feature map input to the any first input adaptation branch may be downsampled at a ratio of an integer multiple. For example, the downsampling ratio of the any first input adaptation branch for the feature map is 2, and the stride of the at least one first convolutional layer is 2. In this case, the at least one first convolutional layer may reduce a size of the feature map input to the any first input adaptation branch by two times.

In an embodiment, any second input adaptation branch that is in the plurality of input adaptation branches and whose downsampling ratio for the feature map is a non-integer multiple includes at least one upsampling module and at least one second convolutional layer, the at least one upsampling module is configured to upsample the feature map, the at least one second convolutional layer is configured to downsample a feature map obtained through upsampling, and an upsampling ratio of the at least one upsampling module for the feature map and a stride of the at least one second convolutional layer are determined based on the downsampling ratio of the any second input adaptation branch for the feature map.

For example, a downsampling ratio of the input adaptation branch 2 shown in FIG. 2 is a non-integer multiple. In this case, the second input adaptation branch may be the input adaptation branch 2, the at least one upsampling module may be an upsampling module in the input adaptation branch 2, the second convolutional layer may be a convolutional layer in the input adaptation branch 2, an upsampling ratio of the upsampling module in the input adaptation branch 2 is determined based on the downsampling ratio of the input adaptation branch 2, and a stride of the convolutional layer in the input adaptation branch 2 is determined based on the downsampling ratio of the input adaptation branch 2. For example, the downsampling ratio of the input adaptation branch 2 is 1.5, the upsampling ratio of the upsampling module in the input adaptation branch 2 is 2, and the stride of the convolutional layer in the input adaptation branch 2 is 3. In this case, the input adaptation branch 2 first performs 2× upsampling on the input feature map, and then performs 3× downsampling on a feature map obtained after upsampling for output, so that a feature map output by the input adaptation branch 2 is reduced by 1.5 times compared with the feature map input to the input adaptation branch 2.

It should be noted that a specific implementation of upsampling performed by the upsampling module is not specifically limited in this application, and may be any upsampling manner.

In an embodiment, the any second input adaptation branch whose downsampling ratio for the feature map is a non-integer multiple may first upsample the input feature map by using the at least one upsampling module, and then downsample, by using the at least one second convolutional layer, the feature map obtained through upsampling. A ratio at which the feature map is downsampled by using the convolutional layer is related to a stride of the convolutional layer. After the upsampling ratio of the at least one upsampling module for the feature map and the stride of the at least one second convolutional layer are determined based on the downsampling ratio of the any second input adaptation branch for the feature map, the feature map input to the any second input adaptation branch may be downsampled at a ratio of a non-integer multiple. For example, the downsampling ratio of the any second input adaptation branch for the feature map is 1.5, the upsampling ratio of the at least one upsampling module for the feature map is 2, and the stride of the at least one second convolutional layer is 3. In this case, the any second input adaptation branch may first increase a size of the input feature map by two times, and then reduce the size of the input feature map by three times for output, so that the size of the feature map is overall reduced by 1.5 times from input to output.

In an embodiment, any third input adaptation branch that is in the plurality of input adaptation branches and whose downsampling ratio for the feature map is greater than 1 includes at least one residual block (ResBlock) structure, the at least one residual block structure is configured to downsample the feature map, the at least one residual block structure includes a plurality of third convolutional layers, and a stride of any one of the plurality of third convolutional layers is determined based on the downsampling ratio of the any third input adaptation branch for the feature map.

For example, downsampling ratios of the input adaptation branch 2, the input adaptation branch 3, and the input adaptation branch 4 shown in FIG. 2 are greater than 1. In this case, the third input adaptation branch may be any one of the input adaptation branch 2, the input adaptation branch 3, and the input adaptation branch 4; the any one of the input adaptation branch 2, the input adaptation branch 3, and the input adaptation branch 4 may downsample the input feature map by using at least one residual block structure, and the at least one residual block structure downsamples the input feature map by using a plurality of third convolutional layers; and a stride of any one of the plurality of third convolutional layers in the at least one residual block structure in each of the input adaptation branch 2, the input adaptation branch 3, and the input adaptation branch 4 may be determined based on each of the downsampling ratios of the input adaptation branch 2, the input adaptation branch 3, and the input adaptation branch 4 for the feature map. For example, the input adaptation branch 3 is used. In this case, the downsampling ratio of the input adaptation branch 3 is 2, a residual block structure in the input adaptation branch 3 includes a convolutional layer with a 1×1 convolution kernel and a convolutional layer with a 3×3 convolution kernel, and a stride of each of the convolutional layer with a 1×1 convolution kernel and the convolutional layer with a 3×3 convolution kernel is 2.

In an embodiment, the any third input adaptation branch whose downsampling ratio for the feature map is greater than 1 may downsample the input feature map by using the at least one residual block structure. The at least one residual block structure includes the plurality of third convolutional layers, and a ratio at which the feature map is downsampled by using the convolutional layer is related to a stride of the convolutional layer. Therefore, after the stride of the any one of the plurality of third convolutional layers is determined based on the downsampling ratio of the any third input adaptation branch for the feature map, the feature map input to the any third input adaptation branch may be downsampled at a ratio greater than 1. In addition, it may be understood that the residual block structure further includes another layer in addition to the plurality of third convolutional layers used for downsampling, but the another layer does not change a size of the input feature map, and the convolutional layer changes the size of the input feature map.

In an embodiment, the one input adaptation branch is determined based on a maximum value between a first ratio and a second ratio, the first ratio is a ratio of a width of the first feature map to a width of the preset size threshold, and the second ratio is a ratio of a height of the first feature map to a height of the preset size threshold.

For example, the input adaptation branch 1, the input adaptation branch 2, the input adaptation branch 3, and the input adaptation branch 4 in FIG. 2 are used, the first ratio is RW=In_W/Th_W, and the second ratio is RH=In_H/Th_H, where Th_W is a width of an upper limit size of an input feature map of a backbone network core part, namely, a width of the upper limit size of the input feature map of the post-processing part, Th_H is a height of the upper limit size of the input feature map of the backbone network core part, namely, a height of the upper limit size of the input feature map of the post-processing part, In_W is a width of an input feature map of the neural network model, namely, the width of the first feature map, and In_H is a height of the input feature map of the neural network model, namely, the height of the first feature map. In this case, a relationship between max(RW, RH) and 1 is first determined. If max(RW, RH)≤1, the input adaptation branch 1 is used. If max(RW, RH)≥1, a relationship between max(RW, RH) and 1.5 is determined. If max(RW, RH)≤1.5, the input adaptation branch 2 is used. If max(RW, RH)>1.5, a relationship between max(RW, RH) and 2 is determined. If max(RW, RH)≤2, the input adaptation branch 3 is used. Otherwise, the input adaptation branch 4 is used.

In an embodiment, the ratio of the width of the first feature map to the width of the upper limit size of the input feature map of the post-processing part and the ratio of the height of the first feature map to the height of the upper limit size of the input feature map of the post-processing part are calculated, and then one input adaptation branch is selected from the plurality of input adaptation branches based on the maximum value between the two ratios, to downsample the first feature map. In this way, it can be ensured that a width and a height of a feature map obtained by downsampling the first feature map are not respectively greater than the width and the height of the upper limit size of the input feature map of the post-processing part.

In operation 302, the electronic device inputs the second feature map to the post-processing part for post-processing, to obtain a processing result of the first feature map.

For example, the post-processing part includes a backbone network core part and a head network, and the second feature map is the feature map F_B shown in FIG. 2. In this case, the feature map F_B is input to the backbone network core part, to obtain a feature map F_C; and then, the feature map F_C is input to the head network, to obtain a processing result.

For another example, the post-processing part includes a backbone network core part, a neck network, and a head network, and the second feature map is the feature map F_B shown in FIG. 2. In this case, the feature map F_B is input to the backbone network core part, to obtain a feature map F_C; then, the feature map F_C is input to the neck network, to obtain a feature map F_D; and then, the feature map F_D is input to the head network, to obtain a processing result.

In an embodiment, if the size of the second feature map is greater than the preset size threshold, the method further includes: capturing a third feature map from the second feature map, where a size of the third feature map is not greater than the preset size threshold; and inputting the third feature map to the post-processing part for post-processing, to obtain a processing result of the first feature map.

It should be noted that when the input feature map has a higher resolution, after the input feature map passes through an input adaptation branch with a highest downsampling ratio, a width of an output feature map may still be greater than Th_W or a height of an output feature map may still be greater than Th_H. In this case, a sub-region in the feature map output by the input adaptation branch may be captured, so that an area of the sub-region does not exceed a product of Th_W and Th_H, or a width and a height of the sub-region do not respectively exceed Th_W and Th_H. Preferably, the sub-region usually may be a sub-region close to a center of the feature map output by the input adaptation branch (that is, Center Crop).

For example, the first feature map is a feature map F_A, the second feature map is a feature map F_B', and the third feature map is a feature map F_B. For the input adaptation branch shown in FIG. 2, when a width and height of the input feature map F_A are 60, the input adaptation branch 4 is selected to complete 3× downsampling, and a feature map F_B' whose width and height are 20 is output. However, Th_W and Th_H are still exceeded. In this case, a feature map region whose center is a center of the feature map F_B', whose width is Th_W, and whose height is Th_H may be captured, to obtain a feature map F_B, and the feature map F_B is used as an input of the backbone network core part.

In an embodiment, the input first feature map may have an excessively large size, and after downsampling is performed by using an input adaptation branch, for example, after downsampling is performed by using an input adaptation branch with a highest downsampling ratio, a size of an obtained second feature map may still be greater than the upper limit size of the input feature map of the post-processing part. In this case, a third feature map whose size is not greater than the upper limit size of the input feature map of the post-processing part is captured from the second feature map, and the third feature map is input to the post-processing part for post-processing, to obtain a processing result of the first feature map. In this way, it can be ensured that the processing result of the first feature map can be obtained after the first feature map input to the neural network model is processed.

In an embodiment of this application, a visual task neural network used for processing a machine task is a feature domain task network that uses a feature map as an input. For example, for the neural network model designed in this application, an input may be a feature map reconstructed by parsing a bitstream by a decoder, and an output is a task processing result corresponding to the feature map. In this way, compared with an image domain task network, a process of obtaining a reconstructed image based on the reconstructed feature map is skipped, to reduce computing power. In addition, computing power required for the neural network model to process the feature map is lower than that required to process an image. Further, the neural network model designed in this application includes the plurality of input adaptation branches and the post-processing part. The output of each of the plurality of input adaptation branches is the input of the post-processing part, and each of the plurality of input adaptation branches may downsample the feature map at a different ratio. For each of first feature maps with different sizes (resolutions) input to the neural network model, one input adaptation branch may be selected from the plurality of input adaptation branches based on a size of the first feature map and the upper limit size of the input feature map of the post-processing part, and the first feature map is downsampled by using the one input adaptation branch, to generate a second feature map whose size is not greater than the upper limit size of the input feature map of the post-processing part. In this way, the second feature map meets a size requirement of the post-processing part for the input feature map, and the second feature map is input to the post-processing part for post-processing, to obtain a processing result of the first feature map. Therefore, in this application, when the input feature map of the neural network model has a different resolution, a high analysis precision may be maintained by using similar computing power. In addition, compared with a case in which an independent neural network model (each network has similar computing power) is trained for an input feature map with each resolution, and then a feature map with a different resolution is processed by using a neural network model trained for the different resolution, the neural network model designed in this application can implement a same function by using the plurality of input adaptation branches, the plurality of input adaptation branches are a backbone network front part in the neural network model, and the neural network model has only one post-processing part (a backbone network core part and a head network). In this way, network parameters can be significantly reduced, and the network model does not need to be switched during inference, to reduce difficulty in model deployment.

In an embodiment, the method further includes: performing N rounds of training on the neural network model based on a training sample set, to obtain N first loss values, where the training sample set includes sample feature maps with at least N sizes, N is not less than a quantity of the plurality of input adaptation branches, and N is an integer; obtaining a second loss value based on the N first loss values; and updating a parameter of the neural network model based on the second loss value.

For example, the training sample set in this application includes sample feature maps with at least N sizes. For example, each batch in training includes feature maps, with N different resolutions, of a plurality of images. The plurality of images may be scaled to the N resolutions, and then an end-to-end image encoder is run to obtain feature maps corresponding to the batch of images in a case of each resolution, so as to obtain the feature maps, with the N different resolutions, of the plurality of images. In this way, the network parameter is iteratively updated by using the following four steps for a plurality of batches, to obtain network parameters of the plurality of input adaptation branches through training. Each of the plurality of batches includes the feature maps, with the N different resolutions, of the plurality of images.

(1) Each batch is divided into N rounds, and in each round, a feature map with one resolution is input to the neural network model, and inference processing is performed to obtain a loss value (Loss) of this round. Herein, N is not less than the quantity of the plurality of input adaptation branches. For example, N may be equal to the quantity of the plurality of input adaptation branches. Feature maps with various resolutions in the feature maps with the N different resolutions are processed by various different input adaptation branches, to ensure that each branch is trained in a balanced manner.

(2) A weighted average of loss values of the N rounds is calculated, to obtain a total loss value. For example, during weighted averaging, a same weight may be used for a loss value corresponding to each input adaptation branch. For another example, a distribution status of a feature map size in actual application may be analyzed, and a weight of a loss value corresponding to each input adaptation branch is set based on the distribution status of the feature map size. A loss value corresponding to an input adaptation branch with a higher distribution probability has a larger weight.

(3) A gradient of the network parameter is calculated through backpropagation (Backpropagation) based on the total loss value.

(4) The network parameter is updated based on the gradient.

In an embodiment, the training sample set used to train the neural network model designed in this application includes sample feature maps with at least N sizes, and a value of N is not less than the quantity of the plurality of input adaptation branches. In this way, when the neural network model is trained by using the training sample set, each of the plurality of input adaptation branches can be trained. Therefore, the N first loss values obtained by performing the N rounds of training on the neural network model include a first loss value corresponding to any one of the plurality of input adaptation branches. The second loss value is obtained based on the N first loss values, and then the parameter of the neural network model is updated based on the second loss value. In this way, a parameter of the any one of the plurality of input adaptation branches is also updated.

FIG. 4 is a schematic diagram of a structure of a feature map processing apparatus according to an embodiment of this application. The feature map processing apparatus 400 is applied to an electronic device. The feature map processing apparatus 400 includes a processing unit 401 and a communication unit 402. The processing unit 401 is configured to perform any step in the method embodiment shown in FIG. 3, and when performing data transmission such as obtaining, may selectively invoke the communication unit 402 to complete a corresponding operation. Detailed descriptions are provided below.

In an embodiment, the feature map processing apparatus 400 is implemented by invoking a neural network model. The neural network model includes a plurality of input adaptation branches and a post-processing part. An output of each of the plurality of input adaptation branches is coupled to an input of the post-processing part. The plurality of input adaptation branches are configured to downsample a feature map, and each of the plurality of input adaptation branches has a different downsampling ratio for the feature map. The processing unit 401 is configured to: input a first feature map to one of the plurality of input adaptation branches, to obtain a second feature map, where the one input adaptation branch is determined based on a size of the first feature map and a preset size threshold, the preset size threshold is an upper limit size of an input feature map of the post-processing part, and a size of the second feature map is not greater than the preset size threshold; and input the second feature map to the post-processing part for post-processing, to obtain a processing result of the first feature map.

In an embodiment, any first input adaptation branch that is in the plurality of input adaptation branches and whose downsampling ratio for the feature map is an integer multiple includes at least one first convolutional layer, the at least one first convolutional layer is configured to downsample the feature map, and a stride of the at least one first convolutional layer is determined based on the downsampling ratio of the any first input adaptation branch for the feature map.

In an embodiment, any second input adaptation branch that is in the plurality of input adaptation branches and whose downsampling ratio for the feature map is a non-integer multiple includes at least one upsampling module and at least one second convolutional layer, the at least one upsampling module is configured to upsample the feature map, the at least one second convolutional layer is configured to downsample a feature map obtained through upsampling, and an upsampling ratio of the at least one upsampling module for the feature map and a stride of the at least one second convolutional layer are determined based on the downsampling ratio of the any second input adaptation branch for the feature map.

In an embodiment, any third input adaptation branch that is in the plurality of input adaptation branches and whose downsampling ratio for the feature map is greater than 1 includes at least one residual block (ResBlock) structure, the at least one residual block structure is configured to downsample the feature map, the at least one residual block structure includes a plurality of third convolutional layers, and a stride of any one of the plurality of third convolutional layers is determined based on the downsampling ratio of the any third input adaptation branch for the feature map.

In an embodiment, the one input adaptation branch is determined based on a maximum value between a first ratio and a second ratio, the first ratio is a ratio of a width of the first feature map to a width of the preset size threshold, and the second ratio is a ratio of a height of the first feature map to a height of the preset size threshold.

In an embodiment, if the size of the second feature map is greater than the preset size threshold, the processing unit 401 is further configured to: capture a third feature map from the second feature map, where a size of the third feature map is not greater than the preset size threshold; and input the third feature map to the post-processing part for post-processing, to obtain a processing result of the first feature map.

In an embodiment, the first feature map is a feature map obtained by decoding a bitstream.

In an embodiment, the processing unit 401 is further configured to: perform N rounds of training on the neural network model based on a training sample set, to obtain N first loss values, where the training sample set includes sample feature maps with at least N sizes, N is not less than a quantity of the plurality of input adaptation branches, and N is an integer; obtain a second loss value based on the N first loss values; and update a parameter of the neural network model based on the second loss value.

The feature map processing apparatus 400 may further include a storage unit 403, configured to store program code and data of the electronic device. The processing unit 401 may be a processor, the communication unit 402 may be a transceiver, and the storage unit 403 may be a memory.

It should be noted that for implementation of the units, refer to the corresponding descriptions in the method embodiment shown in FIG. 3.

In the feature map processing apparatus 400 described in FIG. 4, a visual task neural network used for processing a machine task is a feature domain task network that uses a feature map as an input. For example, for the neural network model designed in this application, an input may be a feature map reconstructed by parsing a bitstream by a decoder, and an output is a task processing result corresponding to the feature map. In this way, compared with an image domain task network, a process of obtaining a reconstructed image based on the reconstructed feature map is skipped, to reduce computing power. In addition, computing power required for the neural network model to process the feature map is lower than that required to process an image. Further, the neural network model designed in this application includes the plurality of input adaptation branches and the post-processing part. The output of each of the plurality of input adaptation branches is the input of the post-processing part, and each of the plurality of input adaptation branches may downsample the feature map at a different ratio. For each of first feature maps with different sizes (resolutions) input to the neural network model, one input adaptation branch may be selected from the plurality of input adaptation branches based on a size of the first feature map and the upper limit size of the input feature map of the post-processing part, and the first feature map is downsampled by using the one input adaptation branch, to generate a second feature map whose size is not greater than the upper limit size of the input feature map of the post-processing part. In this way, the second feature map meets a size requirement of the post-processing part for the input feature map, and the second feature map is input to the post-processing part for post-processing, to obtain a processing result of the first feature map. Therefore, in this application, when the input feature map of the neural network model has a different resolution, a high analysis precision may be maintained by using similar computing power. In addition, compared with a case in which an independent neural network model (each network has similar computing power) is trained for an input feature map with each resolution, and then a feature map with a different resolution is processed by using a neural network model trained for the different resolution, the neural network model designed in this application can implement a same function by using the plurality of input adaptation branches, the plurality of input adaptation branches are a backbone network front part in the neural network model, and the neural network model has only one post-processing part (a backbone network core part and a head network). In this way, network parameters can be significantly reduced, and the network model does not need to be switched during inference, to reduce difficulty in model deployment.

Figure 5:
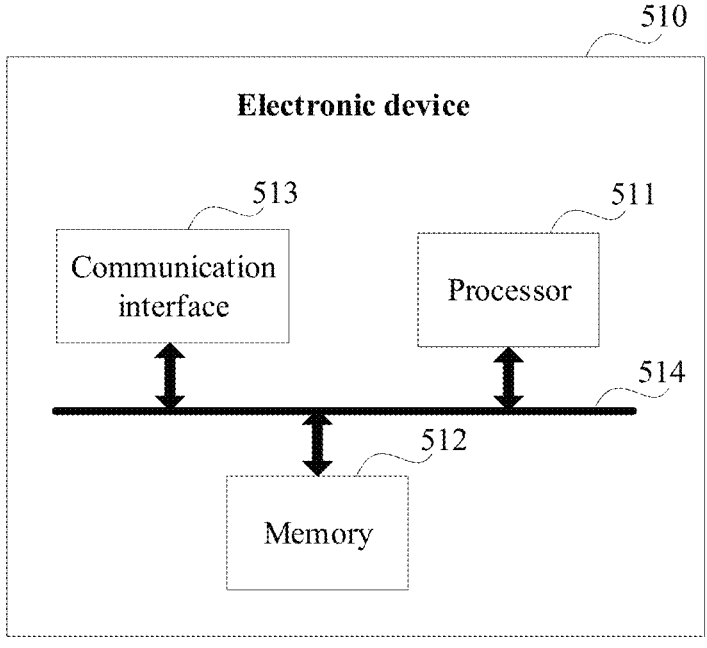
FIG. 5 is a schematic diagram of a structure of an electronic device according to an embodiment of this application.

FIG. 5 is a schematic diagram of a structure of an electronic device 510 according to an embodiment of this application. The electronic device 510 includes a processor 511, a memory 512, and a communication interface 513. The processor 511, the memory 512, and the communication interface 513 are connected to each other through a bus 514.

The memory 512 includes but is not limited to a random access memory (RAM), a read-only memory (ROM), an erasable programmable read-only memory (EPROM), or a compact disc read-only memory (CD-ROM). The memory 512 is configured to store a related computer program and data. The communication interface 513 is configured to receive and send data.

The processor 511 may be one or more central processing units (CPU). When the processor 511 is one CPU, the CPU may be a single-core CPU, or may be a multi-core CPU.

The processor 511 in the electronic device 510 is configured to read computer program code stored in the memory 512, to perform the method shown in FIG. 3.

It should be noted that for implementation of the operations, refer to the corresponding descriptions in the method embodiment shown in FIG. 3.

In the electronic device 510 described in FIG. 5, a visual task neural network used for processing a machine task is a feature domain task network that uses a feature map as an input. For example, for the neural network model designed in this application, an input may be a feature map reconstructed by parsing a bitstream by a decoder, and an output is a task processing result corresponding to the feature map. In this way, compared with an image domain task network, a process of obtaining a reconstructed image based on the reconstructed feature map is skipped, to reduce computing power. In addition, computing power required for the neural network model to process the feature map is lower than that required to process an image. Further, the neural network model designed in this application includes the plurality of input adaptation branches and the post-processing part. The output of each of the plurality of input adaptation branches is the input of the post-processing part, and each of the plurality of input adaptation branches may downsample the feature map at a different ratio. For each of first feature maps with different sizes (resolutions) input to the neural network model, one input adaptation branch may be selected from the plurality of input adaptation branches based on a size of the first feature map and the upper limit size of the input feature map of the post-processing part, and the first feature map is downsampled by using the one input adaptation branch, to generate a second feature map whose size is not greater than the upper limit size of the input feature map of the post-processing part. In this way, the second feature map meets a size requirement of the post-processing part for the input feature map, and the second feature map is input to the post-processing part for post-processing, to obtain a processing result of the first feature map. Therefore, in this application, when the input feature map of the neural network model has a different resolution, a high analysis precision may be maintained by using similar computing power. In addition, compared with a case in which an independent neural network model (each network has similar computing power) is trained for an input feature map with each resolution, and then a feature map with a different resolution is processed by using a neural network model trained for the different resolution, the neural network model designed in this application can implement a same function by using the plurality of input adaptation branches, the plurality of input adaptation branches are a backbone network front part in the neural network model, and the neural network model has only one post-processing part (a backbone network core part and a head network). In this way, network parameters can be significantly reduced, and the network model does not need to be switched during inference, to reduce difficulty in model deployment.

An embodiment of this application further provides a chip. The chip includes at least one processor, memory, and interface circuit. The memory, the interface circuit, and the at least one processor are interconnected through a line. The at least one memory stores a computer program. When the computer program is executed by the processor, the method procedure shown in FIG. 3 is implemented.

An embodiment of this application further provides a computer-readable storage medium. The computer-readable storage medium stores a computer program. When the computer program is run on a computer, the method procedure shown in FIG. 3 is implemented.

An embodiment of this application further provides a computer program product. When the computer program product is run on a computer, the method procedure shown in FIG. 3 is implemented.

It should be understood that the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Based on descriptions used as an example instead of a limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification includes but is not limited to these memories and any memory of another proper type.

It should be further understood that "first", "second", "third", "fourth", and various numbers in this specification are merely used for differentiation for ease of description, and are not intended to limit the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification usually indicates an "or" relationship between associated objects.

It should be understood that in various embodiments of this application, sequence numbers of the processes do not mean execution sequences. The execution sequences of the processes should be determined based on functions and internal logic of the processes, and should not be construed as any limitation on the implementation processes in embodiments of this application.

Persons of ordinary skill in the art may be aware that the example units, algorithms, and steps described with reference to embodiments disclosed in this specification can be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

It may be clearly understood by persons skilled in the art that for convenient and brief description, for detailed working processes of the system, apparatus, and unit described above, refer to the corresponding processes in the foregoing method embodiments. Details are not described herein.

In the several embodiments provided in this application, it should be understood that the disclosed system, apparatus, and method may be implemented in other manners. For example, the described apparatus embodiments are merely examples. For example, division into the units is merely logical function division. In actual implementation, there may be another division manner. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts shown as units may or may not be physical units, may be located at one position, or may be distributed on a plurality of network units. Some or all of the units may be selected based on actual requirements to achieve the objectives of the solutions in embodiments.

In addition, functional units in embodiments of this application may be integrated into one processing unit, each unit may exist alone physically, or two or more units may be integrated into one unit.

When the function is implemented in a form of a software functional unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, for example, a USB flash drive, a removable hard disk, a read-only memory (ROM), a random access memory (RAM), a magnetic disk, or an optical disc.

The steps of the method in embodiments of this application may be sequentially adjusted, combined, or deleted based on an actual requirement.

The modules in the apparatus in embodiments of this application may be combined, divided, and deleted based on an actual requirement.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method for processing feature maps, comprising:
   invoking a neural network model, wherein the neural network model comprises a plurality of input adaptation branches and a post-processing part, an output of each of the plurality of input adaptation branches is coupled to an input of the post-processing part, the plurality of input adaptation branches are configured to downsample a feature map, each of the plurality of input adaptation branches has a different downsampling ratio for the feature map;
   inputting a first feature map to one of the plurality of input adaptation branches, to obtain a second feature map, wherein the input adaptation branch is determined based on a size of the first feature map and a preset size threshold, the preset size threshold is an upper limit size of an input feature map of the post-processing part, and a size of the second feature map is not greater than the preset size threshold; and inputting the second feature map to the post-processing part for post-processing, to obtain a processing result of the first feature map.

2. The method according to claim 1, wherein any first input adaptation branch that is in the plurality of input adaptation branches and whose downsampling ratio for the feature map is an integer multiple comprises at least one first convolutional layer, the at least one first convolutional layer is configured to downsample the feature map, and a stride of the at least one first convolutional layer is determined based on the downsampling ratio of the any first input adaptation branch for the feature map.

3. The method according to claim 1, wherein any second input adaptation branch that is in the plurality of input adaptation branches and whose downsampling ratio for the feature map is a non-integer multiple comprises at least one upsampling module and at least one second convolutional layer, the at least one upsampling module is configured to upsample the feature map, the at least one second convolutional layer is configured to downsample a feature map obtained through upsampling, and an upsampling ratio of the at least one upsampling module for the feature map and a stride of the at least one second convolutional layer are determined based on the downsampling ratio of the any second input adaptation branch for the feature map.

4. The method according to claim 1, wherein any third input adaptation branch that is in the plurality of input adaptation branches and whose downsampling ratio for the feature map is greater than 1 comprises at least one residual block (ResBlock) structure, the at least one residual block structure is configured to downsample the feature map, the at least one residual block structure comprises a plurality of third convolutional layers, and a stride of any one of the plurality of third convolutional layers is determined based on the downsampling ratio of the any third input adaptation branch for the feature map.

5. The method according to claim 1, wherein the input adaptation branch is determined based on a maximum value between a first ratio and a second ratio, the first ratio is a ratio of a width of the first feature map to a width of the preset size threshold, and the second ratio is a ratio of a height of the first feature map to a height of the preset size threshold.

6. The method according to claim 1, wherein if the size of the second feature map is greater than the preset size threshold, the method further comprises:

capturing a third feature map from the second feature map, wherein a size of the third feature map is not greater than the preset size threshold; and inputting the third feature map to the post-processing part for post-processing, to obtain a processing result of the first feature map.

7. The method according to claim 1, wherein the first feature map is a obtained by decoding a bitstream.

8. The method according to claim 1, wherein the method further comprises:

performing N rounds of training on the neural network model based on a training sample set, to obtain N first loss values, wherein the training sample set comprises sample feature maps with at least N sizes, N is not less than a quantity of the plurality of input adaptation branches, and N is an integer;

obtaining a second loss value based on the N first loss values; and updating a parameter of the neural network model based on the second loss value.

9. An apparatus for processing feature maps, comprising: a processor configured to:

invoke a neural network model, wherein the neural network model comprises a plurality of input adaptation branches and a post-processing part, an output of each of the plurality of input adaptation branches is coupled to an input of the post-processing part, the plurality of input adaptation branches are configured to downsample a feature map, each of the plurality of input adaptation branches has a different downsampling ratio for the feature map;

input a first feature map to one of the plurality of input adaptation branches, to obtain a second feature map, wherein the one input adaptation branch is determined based on a size of the first feature map and a preset size threshold, the preset size threshold is an upper limit size of an input feature map of the post-processing part, and a size of the second feature map is not greater than the preset size threshold; and input the second feature map to the post-processing part for post-processing, to obtain a processing result of the first feature map.

10. The apparatus according to claim 9, wherein any first input adaptation branch that is in the plurality of input adaptation branches and whose downsampling ratio for the feature map is an integer multiple comprises at least one first convolutional layer, the at least one first convolutional layer is configured to downsample the feature map, and a stride of the at least one first convolutional layer is determined based on the downsampling ratio of the any first input adaptation branch for the feature map.

11. The apparatus according to claim 9, wherein any second input adaptation branch that is in the plurality of input adaptation branches and whose downsampling ratio for the feature map is a non-integer multiple comprises at least one upsampling module and at least one second convolutional layer, the at least one upsampling module is configured to upsample the feature map, the at least one second convolutional layer is configured to downsample a feature map obtained through upsampling, and an upsampling ratio of the at least one upsampling module for the feature map and a stride of the at least one second convolutional layer are determined based on the downsampling ratio of the any second input adaptation branch for the feature map.

12. The apparatus according to claim 9, wherein any third input adaptation branch that is in the plurality of input adaptation branches and whose downsampling ratio for the feature map is greater than 1 comprises at least one residual block (ResBlock) structure, the at least one residual block structure is configured to downsample the feature map, the at least one residual block structure comprises a plurality of third convolutional layers, and a stride of any one of the plurality of third convolutional layers is determined based on the downsampling ratio of the any third input adaptation branch for the feature map.

13. The apparatus according to claim 9, wherein the one input adaptation branch is determined based on a maximum value between a first ratio and a second ratio, the first ratio is a ratio of a width of the first feature map to a width of the preset size threshold, and the second ratio is a ratio of a height of the first feature map to a height of the preset size threshold.

14. The apparatus according to claim 9, wherein if the size of the second feature map is greater than the preset size threshold, the processor is further configured to:

capture a third feature map from the second feature map, wherein a size of the third feature map is not greater than the preset size threshold; and input the third feature map to the post-processing part for post-processing, to obtain a processing result of the first feature map.

15. The apparatus according to claim 9, wherein the first feature map is a feature map obtained by decoding a bitstream.

16. The apparatus according to claim 9, wherein the processor is further configured to:

perform N rounds of training on the neural network model based on a training sample set, to obtain N first loss values, wherein the training sample set comprises sample feature maps with at least N sizes, N is not less than a quantity of the plurality of input adaptation branches, and N is an integer;

obtain a second loss value based on the N first loss values; and update a parameter of the neural network model based on the second loss value.

17. A non-transitory computer-readable storage medium, comprising program code, wherein when the program code is executed by a computer, causes the computer to perform a method of processing feature maps, the method comprising:

invoking a neural network model, wherein the neural network model comprises a plurality of input adaptation branches and a post-processing part, an output of each of the plurality of input adaptation branches is coupled to an input of the post-processing part, the plurality of input adaptation branches are configured to downsample a feature map, each of the plurality of input adaptation branches has a different downsampling ratio for the feature map;

inputting a first feature map to one of the plurality of input adaptation branches, to obtain a second feature map, wherein the input adaptation branch is determined based on a size of the first feature map and a preset size threshold, the preset size threshold is an upper limit size of an input feature map of the post-processing part, and a size of the second feature map is not greater than the preset size threshold; and inputting the second feature map to the post-processing part for post-processing, to obtain a processing result of the first feature map.

18. The computer-readable storage medium according to claim 17, wherein any first input adaptation branch that is in the plurality of input adaptation branches and whose downsampling ratio for the feature map is an integer multiple comprises at least one first convolutional layer, the at least one first convolutional layer is configured to downsample the feature map, and a stride of the at least one first convolutional layer is determined based on the downsampling ratio of the any first input adaptation branch for the feature map.

19. The computer-readable storage medium according to claim 17, wherein any second input adaptation branch that is in the plurality of input adaptation branches and whose downsampling ratio for the feature map is a non-integer multiple comprises at least one upsampling module and at least one second convolutional layer, the at least one upsampling module is configured to upsample the feature map, the at least one second convolutional layer is configured to downsample a feature map obtained through upsampling, and an upsampling ratio of the at least one upsampling module for the feature map and a stride of the at least one second convolutional layer are determined based on the downsampling ratio of the any second input adaptation branch for the feature map.

20. The computer-readable storage medium according to claim 17, wherein any third input adaptation branch that is in the plurality of input adaptation branches and whose downsampling ratio for the feature map is greater than 1 comprises at least one residual block (ResBlock) structure, the at least one residual block structure is configured to downsample the feature map, the at least one residual block structure comprises a plurality of third convolutional layers, and a stride of any one of the plurality of third convolutional layers is determined based on the downsampling ratio of the any third input adaptation branch for the feature map.

* * * * *